Aug. 13, 1968 J. E. MORSE ET AL 3,396,732
INFORMATION STORAGE AND RETRIEVAL APPARATUS
Original Filed Oct. 26, 1967 4 Sheets-Sheet 1

JOHN E. MORSE
WILLIAM C. THOMAS
INVENTORS
BY R. Frank Smith
Lloyd F. Sebach
ATTORNEY & AGENT Aug. 13, 1968 J. E. MORSE ET AL 3,396,732

INFORMATION STORAGE AND RETRIEVAL APPARATUS

Original Filed Oct. 26, 1967 4 Sheets-Sheet 2

JOHN E. MORSE
WILLIAM C. THOMAS
INVENTORS

BY R. Frank Smith
Lloyd F. Seebach
ATTORNEY & AGENT

Aug. 13, 1968 J. E. MORSE ET AL 3,396,732

INFORMATION STORAGE AND RETRIEVAL APPARATUS

Original Filed Oct. 26, 1967 4 Sheets-Sheet 3

JOHN E. MORSE
WILLIAM C. THOMAS
INVENTORS

BY R. Frank Smith
Lloyd F. Seebach
ATTORNEY & AGENT

INFORMATION STORAGE AND RETRIEVAL APPARATUS

Original Filed Oct. 26, 1967 4 Sheets-Sheet 4

JOHN E. MORSE
WILLIAM C. THOMAS
INVENTORS

BY R. Frank Smith
Lloyd F. Seebach
ATTORNEY & AGENT

United States Patent Office 3,396,732

Patented Aug. 13, 1968

3,396,732

INFORMATION STORAGE AND RETRIEVAL APPARATUS

John E. Morse and William C. Thomas, Rochester, N.Y., assignors to Eastman Kodak Company, Rochester, N.Y., a corporation of New Jersey Continuation of application Ser. No. 406,499, Oct. 26, 1967. This application Aug. 11, 1967, Ser. No. 660,140
1 Claim. (Cl. 129—16.1)

ABSTRACT OF THE DISCLOSURE

An apparatus for retrieving preselected information elements of the type which are substantially rectangular and have identifying notch and land configurations on opposite longitudinal edges thereof, form a stacked arrangement of similar, vertically suspended elements. The apparatus includes a first pair of opposed movable bars which suspend the arrangement in a first position and a control mechanism which transfers suspension of the arrangement to a predetermined combination of other bars so that the preselected elements move downward to a second suspended position and the remainder of the arrangement remains in the first position. Thereafter, the control mechanism returns suspension of the arrangement to the first pair of opposed bars and the preselected elements, which have moved to the second suspended position, fall from the arrangement.

This is a continuation of application Ser. No. 406,-499, filed Oct. 26, 1964.

The present invention relates to information handling systems and more particularly to apparatus for retrieving at least one element from a group or arrangement of similar elements wherein each element is encoded along a pair of opposite edges with identifying information.

In present commercial information storage and retrieval systems in which graphic and/or digital information is recorded on a photosensitive strip, such a strip is frequently of such a length that it is maintained in the form of a roll and the pertinent information for locating a particular image area is encoded either between or alongside each such image area. These arrangements require that at least a portion of the roll be scanned in order to locate such image area. In the event the desired image area is located at or near the very end of the roll, the complete roll must be scanned.

In other systems where graphic or digital information is recorded on a short strip, one or more of such strips are retained within a carrier that is provided with a legible indication of the information contained or recorded on the strips held thereby. In order to locate any particular strip in this system, the searcher, in effect, visually scans each carrier until the desired one is observed.

The apparatus of the present invention has been devised for storing a group of elements, each of which carries at least one information bearing medium, and for retrieving from such group at least one element by means of the information encoded in a pair of opposite edges thereof. The encoded information can be related to that on the medium or can identify the element per se by an alpha, numeric, or alpha-numeric designation. With the apparatus described hereinafter, any desired element in the group can be automatically retrieved and the information recorded on the medium can then be read and/or reproduced. The system described hereinafter possesses many advantages over those of the prior art in that the elements can be randomly stored, the elements are sensed or scanned simultaneously (in parallel) without the necessity for sequentially scanning undesired elements, the medium per se can be removed from the element for reading and/or reproduction, and any element can be updated by either replacing the old medium by a new medium or adding a new medium to another element having the same code designation so that all elements having such designation can be retrieved.

Graphic and/or digital information that is recorded on a strip of photosensitive film, as well as digital information that is recorded on a strip of magnetic or paper tape, can be positioned on or within an element or carrier having correspondingly spaced notches in each of a pair of opposite edges for forming a land between each pair of adjacent notches. Combinations of preselected lands are removed for identifying each such element or the information recorded on the medium. A plurality of such elements are retained within a housing by a pair of members that engage certain notches in each element to support the arrangement of elements in a vertically suspended direction. As discussed hereinbelow, the lands can be removed in accordance with any one of a number of systems or encoding information and the procedure for retrieving a desired element is the same, except that a compatible form of selecting means is necessary. The selecting means establishes a combination of selecting members which are moved simultaneously into engagement with corresponding notches in the vertically arranged elements. After such selecting members are in position, the supporting members are removed. Any element that has a combination of removed lands corresponding to the combination of selecting members engaging the elements, then drops by gravity a distance corresponding to that between adjacent notches and is held in this position by an edge of the adjacent uppermost notches. The supporting members are then returned to their initial position for engaging the arrangement of elements and the selecting members are finally withdrawn. Since the selected element has moved (dropped) relative to the supporting members, such element cannot be engaged and is free to move vertically downward by gravity and onto a receiver which delivers the selected element to the front of the casing. In order to select and retrieve a desired element, the encoded information that identifies such element, or that is unique to the information recorded on the medium, is inserted into the apparatus by means of a set of selection switches. A timing mechanism, which is initiated after the selection switches have been positioned, controls the cyclic operation of the apparatus for retrieval of the desired element. So long as a retrieved element is returned to the proper bin or receptacle therefor, it does not have to be returned in any particular order with respect to the other elements in the same bin or receptacle. While the selected element has been described above as moving by gravity relative to the arrangement and from the arrangement, such movement can be assisted or accomplished by means of an induced force, such as magnetic attraction, inertial acceleration, pneumatic means, etc.

It is a primary object of the invention to provide an information handling system in which a selected randomly stored element carrying an information bearing medium can be automatically retrieved from a group of similar elements.

Another object of the invention is to provide an information handling system in which a group of elements, each of which carries an information bearing medium, are retained in a stack and at least one of said elements can be selectively and automatically retrieved from the stack by movement relative thereto.

Still another object of the invention is to provide an information storage and retrieval apparatus in which each element in a group of elements has identifying information encoded in a pair of opposite edges and a selected element is retrieved by a code request corresponding to its identifying information.

Yet another object of the invention is to provide a rapid access retrieval system in which an arrangement of similar elements are sensed simultaneously by a preset combination of selecting members and any element corresponding to such selecting members is automatically discharged from the arrangement.

And yet another object of the invention is to provide an information storage and retrieval apparatus of modular form so as to permit additions of such modules to increase the size of the system.

These as well as other objects and advantages will be apparent to those skilled in the art by the description which follows when read in conjunction with the accompanying drawings.

Reference is now made to the accompanying drawings wherein like reference numerals and characters designate like parts and wherein.

Figure 2:
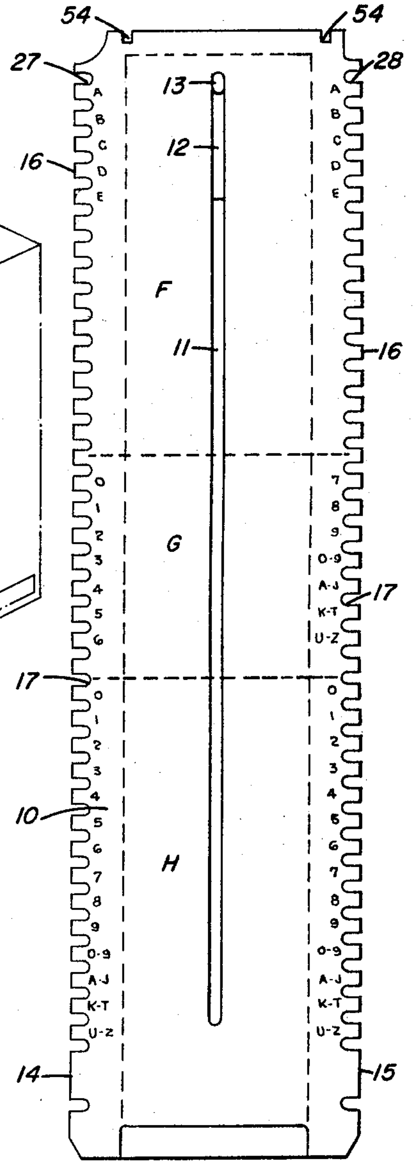
FIG. 2 is a front view of an element on or in which an information bearing medium is carried, and shows the designations that can be assigned to the arrangement of lands for implementing several different code systems.
Figure 7:
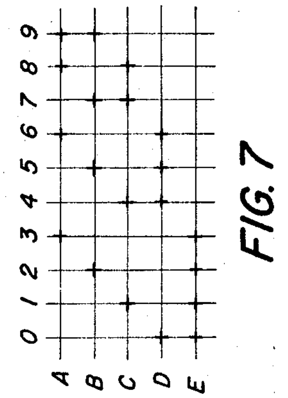
FIG. 7 is a tabular designation of one of the code systems that is used, by way of example, in conjunction with the notches in the element shown in FIG. 2.

Before proceeding with a description of the apparatus per se, it may be well to first describe the form of the element or strip carrier that is used in the apparatus. The element shown in FIG. 2 is more fully described and claimed in a copending application, Ser. No. 406,505, filed Oct. 26, 1964. The element 10 is a single member on which an information bearing medium is mounted or a multi-ply structure provided with a central pocket or cavity in which an information bearing medium 11 can be moved by means of a member 12 that is slidably mounted within the cavity and moved by means engaging an aperture 13 therein, the inner end of medium 11 being fixed to said member. Along opposite longitudinal edges 14 and 15 of element 10, a plurality of lands 16 are formed by a plurality of notches 17. In the present disclosure, by way of an example, information relating to the medium 11, or for identifying the element 10, is encoded on the element by means of a code system as shown in FIG. 7. With this code system the numerals 0–9 can be represented by removal of various combinations of two of the five lands designated A–E in each of edges 14 and 15. It can be readily appreciated that such a sytem permits at least seven digits to be encoded along each edge of the element. This number is merely illustrative in that it can be increased or decreased depending on the size of the notches that are used and the length of the element. In the central section G of element 10 another code system is shown which is similar to that used in well known business machine cards wherein each digit is designated by a particular land and an alpha designation can be obtained by a combination of numeric and alpha designated lands, the lands being divided between each of edges 14 and 15. In the lower section H of element 10, this same alpha-numeric designation is obtained by all of the lands 16 being arranged along one edge of the element. It will be appreciated by those skilled in the art that with such an arrangement of spaced lands in each of the opposite edges of the element 10, many other code systems can be used without departing from the spirit of the invention as disclosed hereinafter with respect to apparatus based on the code system shown in FIG. 7.

As described hereinafter, the release of a selected element 10 is effected by gravity and/or an induced force acting parallel to the edges 14 and 15. For this reason, each land 16 is associated with a corresponding notch 17 which is the one immediately below the land. With this relationship of notch and land, a selecting member, when moved into engagement with a notch 17, supports the element 10 unless its corresponding land 16 has been removed in which case the element can move (drop) by gravity until the adjacent upper notch engages the selecting member. When a combination of selecting members on each side of an arrangement are moved into engagement with their respective notches in each element, only the element or elements having the same combination of removed lands can fall by gravity, see FIGS. 6B and 6C.

Figure 1:
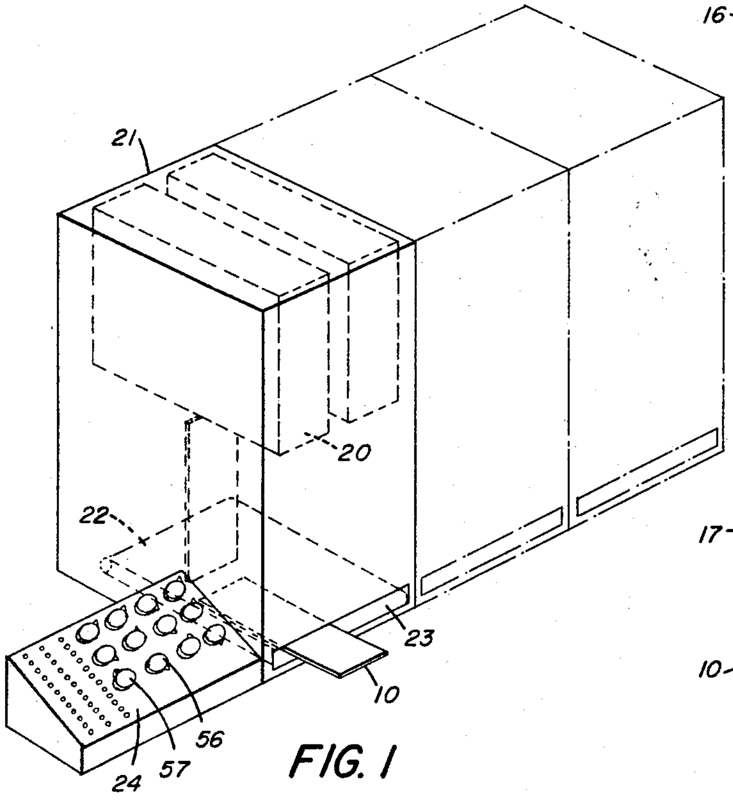
FIG. 1 is a simplified perspective view of an information storage and retrieval apparatus in accordance with the invention and shows in dotted lines a modular arrangement thereof.

As shown in FIG. 1, a group of elements 10 are stacked with their longitudinal edges extending in a vertical direction to form an arrangement 20 which can be positioned within a casing 21 wherein the selected element is delivered to the searcher by an endless belt 22 that moves the selected element through an aperture 23 in the front of the casing 21. Such a casing or module 21 can contain more than one arrangement and several such modules can be arranged in side by side relationship. Adjacent the casing 21 is a selecting device 24 which is described more fully hereinafter.

The arrangement 20 is suspended in a vertical direction within casing 21 by means of a pair of support members 25 and 26 which engage the uppermost pair of slots 27 and 28 in each element. Each of the support members 25, 26 is arranged for movement in a horizontal plane by means of vertically extending rods 29 and 30 and a pair of oblique slots 32 in member 25 and a pair of oppositely inclined slots 33 in member 26. At the rear end of each of members 25 and 26, a spring 34 normally urges its respective member into an engaging position with respect to slots 27 and 28 in each element in the arrangement 20. At the other end of each of members 25 and 26, a pair of links 35 connects its respective member to a bar 36 that is formed integral with or is attached to an armature 37 of a solenoid 38.

Figures 6A, 6B, 6C, 6D:
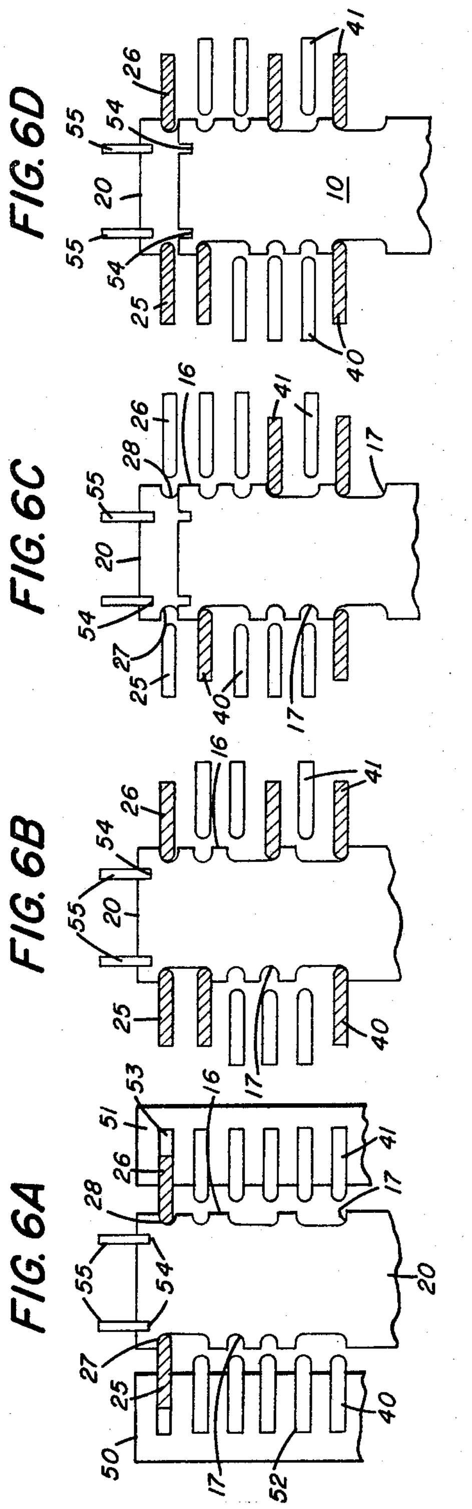
FIGS. 6A–6E are front views showing schematically the sequential operation of the supporting members and the selecting members for releasing an element having a designated identifying code.
Figure 6E:
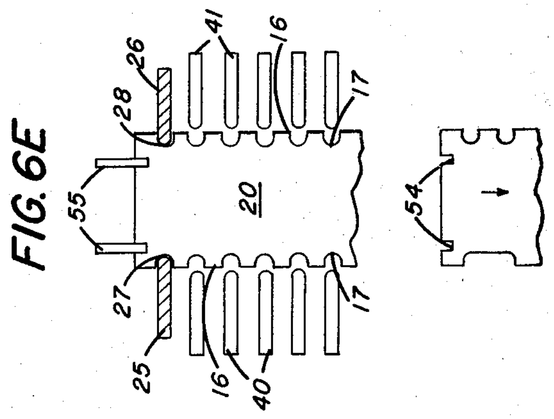

A plurality of selecting members 40 and 41 are arranged adjacent opposite sides of arrangement 20, each of the selecting members being aligned with a corresponding notch 17 in each of the elements 10. Each selecting member is provided with a pair of oblique slots 42 through which the rods 29 and 30 also extend. It should be noted that the oblique slots 42 in members 40 are inclined in an opposite direction as compared with those in members 41, in order that both groups of members can be moved simultaneously as described more fully hereinafter. Each of selecting members 40 and 41 has a spring 43 connected to the rear end thereof for retaining its respective selecting member in a disengaged position. At the forward end of each of members 40, a link 44 connects its respective member to an armature 45 of a solenoid 46, and at the forward end of each of members 41, a link 47 connects its respective member to an armature 48 of a solenoid 49. With reference to FIG. 6A, supporting members 25 and 26 as well as selecting members 40 and 41 are mounted for movement in a horizontal plane by their respective springs and solenoids in guide members 50 and 51 which are provided with suitable slots 52 and 53, respectively, therefor. In order to properly orient each of elements 10 relative to arrangement 20 and to prevent turning of the elements, each element is provided with a pair of slots 54 which are spaced in accordance with a pair of locators 55 that engage such slots in each element in arrangement 20, see FIGS. 6A–6E.

Figure 3:
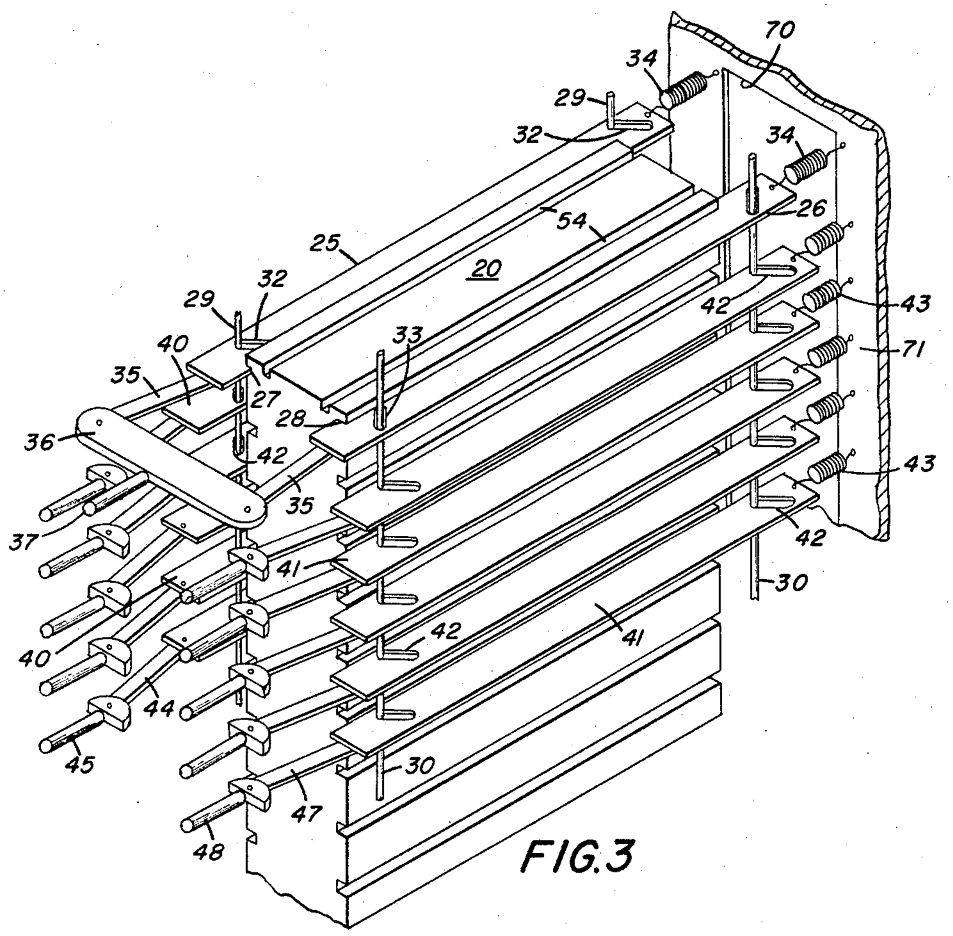
FIG. 3 is a perspective view showing the supporting members and selecting members arranged along opposite sides of an arrangement of encoded elements and the means for actuating such members.
Figure 4:
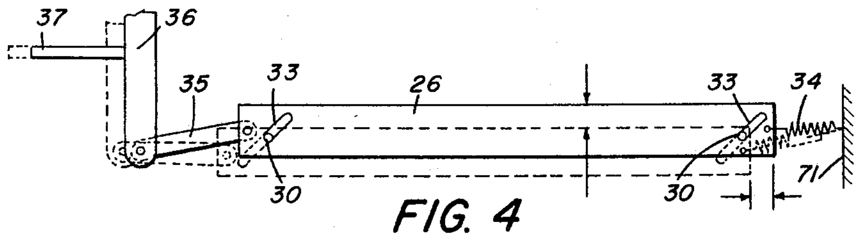
FIG. 4 is a detail plan view of one of the support members showing the structure for moving such member relative to the arrangement of elements.

In FIG. 4 the member 26 is shown in full line in the position it assumes for engaging the uppermost notches 28 for supporting the arrangement 20. The member 26 is held in this position by spring 34 with the lowermost end of slot 33 engaging rod 30. When its respective solenoid 38 is energized, the armature 37 is drawn to the left and the link 35 moves the member 26 to the left and in a downward direction, as seen in FIG. 4, until the other end of slot 33 engages rod 30. In this position the member 26 is withdrawn from its respective notches 28. When solenoid 38 is deenergizer, the spring 34 moves the armature 37, link 35 and member 26 to the right and due to the arrangement of slot 33, also in an upward direction, as seen in FIG. 4, so that the member 26 is moved into its engaging position relative to arrangement 20. The sequence of operation of supporting member 25 is the same as that described for member 26 and due to the inclination of slots 32 and 33 and the connection to a common actuating means, the operation occurs simultaneously. While reference has been made to movement of these parts in an upward and downward direction relative to the showing in FIG. 4, these directions are actually dependent on the position of the parts relative to the arrangement 20 so that as shown in FIG. 3 such movement is away from and toward arrangement 20. The same operation takes place with respect to selecting members 40 and 41 with the exception that the directions of movement are reversed in that these members are moved from a disengaged position to an engaging position and then returned to the disengaged position relative to arrangement 20.

The selecting means is generally designated by the numeral 24 and comprises at least a pair of multiple position switches 56 and 57 for the example described hereinafter. Each of switches 56 and 57 is associated with a code designation encoded on a respective edge of element 10. Additional switches of the same type can be added to extend the code beyond the two digits used in the described operation of the invention.

Inasmuch as switches 56 and 57 perform the same function, the structure and connections of only one of such switches needs to be described. Switch 56 is a commercially available 10 position, 5 wafer, tap switch. Each position corresponds to one of the numerical designations 0–9 and each wafer corresponds to a land A–E (section F) on the element, see FIG. 2. The positions and wafers are therefore interconnected to the solenoids 46A–46E in accordance with the chart shown in FIG. 7. When switch 56 is set in any one of positions 0–9, a predetermined combination of two of solenoids 46A–46E are connected across lines 58 and 59. A source of potential is applied across lines 59 and 60.

In order to provide cyclic operation for the selection of a desired element 10, a motor 61 is connected across lines 59 and 60 by means of a push button switch 62. The motor 61, when energized, drives a plurality of cams 63, 64 and 65 which actuate respective switches 66, 67 and 68. The motor 61 with its driven cams provides a timing means for cyclically actuating the supporting members 25 and 26 and combinations of the selecting members 40 and 41 to release the desired element 10 from the arrangement 20.

Figure 5:
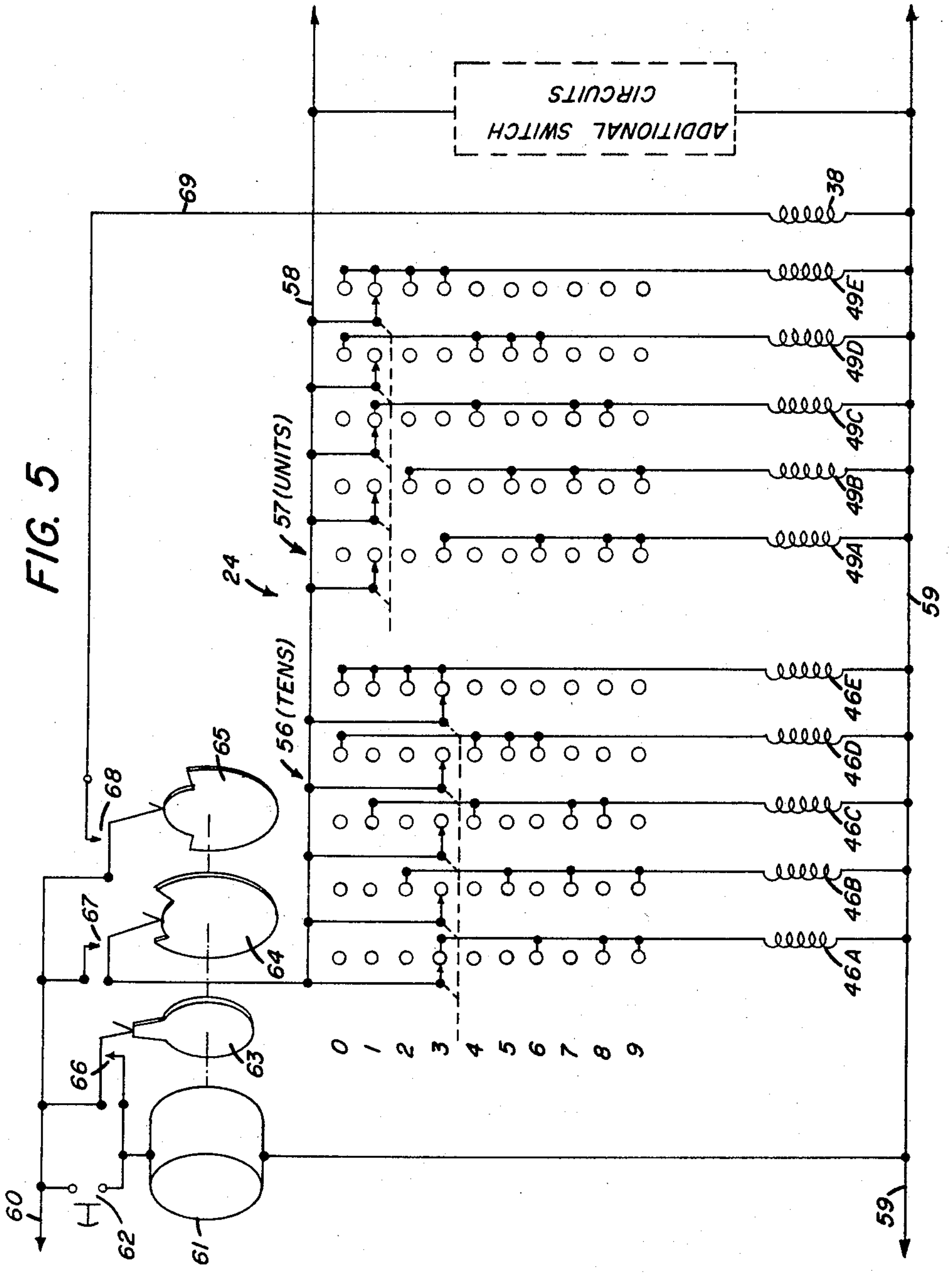
FIG. 5 is a schematic wiring diagram showing the means for selecting and cyclically operating the supporting members and the selecting members.

The operation of the apparatus can be best understood by assuming and describing a selection procedure with respect to a particular example. If the elements 10 are merely encoded with numbers designating different mediums carried thereby, or each number identifies a particular element 10, let it be assumed that an element 10 encoded with the number "31" is to be selected from a group of 100 elements in the arrangement 20 which are randomly arranged. In this instance, the units digit will be designated by the lands 16A–16E on the righthand side of element 10 in FIG. 2 whereas the tens digit will be designated by the lands 16A–16E on the lefthand side. As shown in FIG. 6A, such an element has the lands 16C and 16E removed on the righthand side of the lands 16A and 16E removed on the lefthand side in accordance with the code chart in FIG. 7. To obtain this combination of selection members the operator sets switch 56 (tens) in the "3" position and switch 57 (units) in the "1" position. With reference to FIG. 5, it will be noted that these settings connect solenoid 46A, 46E, 49C and 49E across lines 58 and 59. When this selection has been made, the switch 62 is actuated and the motor 61 is energized to rotate cams 63, 64 and 65 as a unit. Cam 63 actuates switch 66 to a closed position immediately and thereby holds motor 61 energized for a cycle of operation. Cam 64 closes switch 67 after the closure of switch 66 and connects the solenoids 46A, 46E, 49C and 49E across lines 59 and 60 via switch 67 and line 58. With the energization of these solenoids, the selecting members 40 and 41 connected thereto by respective links 44 and 47 are moved into an engaging position with respect to arrangement 20, see FIG. 6B, whereby the elements in the arrangement are sensed or read simultaneously. After this occurs, cam 65 closes switch 68 and solenoid 38 is energized by connection across lines 59 and 60 via switch 68 and line 69 for moving members 25 and 26 into a position in which they are disengaged from notches 27 and 28 and the arrangement 20, see FIG. 6C. At this point in the cycle of operation, the arrangement 20 is supported by the combinations of members 40 and 41 that had been actuated into an engaging position. Since one of the elements 10 has lands 16A and 16E on the lefthand side and 16C and 16E on the righthand side removed and each such land is immediately above a selecting member, this particular element can fall vertically by gravity until the edge of the next adjacent notch engages the selecting members as shown in FIG. 6D.

Due to the configuration of cams 64 and 65, switch 68 opens before switch 67. As a result, members 25 and 26 are returned to their engaging position relative to notches 27 and 28 and arrangement 20 by springs 34 so that the arrangement is again engaged by both the supporting members 25 and 26 and the combination of selecting members 40 and 41, but the element that has moved relative to the selecting members is now in a lower position where the notches 27 and 28 cannot be engaged by the supporting members 25 and 26, as seen in FIG. 6D. Finally, cam 64 reaches a position in which switch 67 is opened and the solenoids 46A, 46E, 49C and 49E are deenergized so that the selected combinations of members 40 and 41 are returned to their disengaged position by their respective springs 43. With the combination of selecting members 40 and 41 returned to their disengaged positions, the selected element 10 is free and falls by gravity from the arrangement 20 onto belt 22 for removal to the outside of the casing 21. At substantially the same time that switch 67 is opened, cam 63 also opens switch 66 to deenergize motor 61, thereby completing a cycle of operation. From the above description it can be readily appreciated that cams 63, 64 and 65 provide a timing means for controlling the energization of any selected combinations of solenoids 46 and 49 so that cyclic movement of the supporting members occurs during the cyclic movement of the combinations of selecting members thereby insuring support of the arrangement at all times during a cycle of operation. The selected element can be returned to arrangement 20 through an opening 70 in a rear wall 71 of casing 21.

As pointed out above, the switches 56 and 57 can be increased in number or a different type of switch can be used in place of these switches in accordance with the code system that is to be used without departing from the spirit of the invention.

The invention has been described in detail with particular reference to preferred embodiments thereof, but it will be understood that variations and modifications can be effected within the spirit and scope of the invention as described hereinabove and as defined by the appended claim.

We claim:

1. An apparatus for selectively separating at least one element from an arrangement of similar elements supported thereby wherein:

(a) each element in said arrangement is generally rectangular in configuration and has a series of spaced notches formed along the substantially entire length of two opposite edges thereof so as to form a plurality of lands respectively between each pair of adjacent notches;

(b) each element in said arrangement has preselected of said lands removed thereby providing two generally parallel identifying edge configurations for that element; and (c) said elements are supported within said arrangement in stacked relation with the series of notches and lands forming the opposed element-identifying edges located respectively in one of two vertical planes which are substantially perpendicular to the horizontal and extend along opposite sides of said arrangement and with corresponding notches and lands on the element-identifying edges of each element horizontally aligned, said apparatus comprising:

(1) holding means for releasably engaging each of said elements in said arrangement;

(2) a plurality of movable selecting bars located on each of the sides of said arrangement defined by the identifying edges of said elements, each of said selecting bars extending horizontally along an entire side of said arrangement and being movable from a position spaced from the identifying edges of said elements to an engaging position within a corresponding notch in each of said elements, said selecting bars when within said notches being vertically aligned along their respective sides of said arrangement and within one of said vertical planes;

(3) means coupled to each of said selecting bars for selectively moving said bars between said spaced and said engaging positions including resilient means engaging one end of each of said bars for urging said bars in a first direction substantially parallel with respect to a side of said arrangement, at least one stationary member engaging each of said bars, a cam surface on each of said bars located in operative relation with respect to one of said stationary members and electromagnetic means in operative relation with each of said bars for selectively urging each bar against said resilient means in a direction substantially opposite said first direction, said cam surfaces in cooperation with said stationary members directing said bars between said engaging and spaced positions in response to the forces imparted to said bars by said resilient and electromagnetic means; and (4) means for sequentially:

actuating on a given side of said arrangement preselected pairs of bar moving means corresponding to the identifying edge configuration of an element to be separated from said arrangement so as to move the selecting bars in operative relation therewith into said engaging position;

actuating said holding means to release the elements of said arrangement so that those elements having identifying edge configurations corresponding to said preselected combination of actuated bars move vertically downward with respect to said arrangement;

actuating said holding means to re-engage those elements which have not moved in said arrangement; and actuating said preselected combination of bar moving means to move the bars coupled thereto back into the spaced position, whereby those elements which have moved with respect to the arrangement drop out of said arrangement.

References Cited

UNITED STATES PATENTS

| | | | |
|---|---|---|---|
| 1,114,519 | 10/1914 | Ralph | 129—16.1 |
| 1,317,684 | 10/1919 | Brown et al. | 129—16.1 |
| 2,146,063 | 2/1939 | Gardin et al. | 129—16.1 X |
| 2,644,459 | 7/1953 | Schommer | 129—16.1 |
| 2,795,226 | 6/1957 | Bralove et al. | 129—16.1 |
| 3,240,210 | 3/1966 | Giambazi | 129—16.1 |

FOREIGN PATENTS

| | | |
|---|---|---|
| 796,100 | 1/1936 | France. |
| 614,436 | 12/1948 | Great Britain. |

JEROME SCHNALL, *Primary Examiner.*